UNITED STATES PATENT OFFICE 2,477,605

PROCESS FOR PRESERVING FOODS

Louis B. Howard and William D. Ramage, Berkeley, and Clyde L. Rasmussen, Albany, Calif., assignors to the United States of America as represented by the Secretary of Agriculture No Drawing. Application June 8, 1945,
Serial No. 598,358

4 Claims. (Cl. 99—193)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to solid, perishable foodstuffs and, in particular, to a process of preserving such foodstuffs which involves partial dehydration of the fresh material, compression if necessary or desired, and subsequent freezing of the partially dehydrated product while avoiding rehydration thereof. For the purposes of this specification the expression "partial dehydration" means the removal of water from the food to a final moisture level much above the moisture level essential for preservation by drying alone and by the term freezing, as applied to the partially dehydrated products, shall be understood to mean lowering the temperature of the products below the normal freezing point of water.

The invention has among its objects the provision of a new process for preserving solid perishable foodstuffs which is simple in operation and highly economical in point of saving of refrigerated storage space. The products, unlike ordinary frozen foods, are not damaged by fluctuations in storage temperature which permit temporary thawing.

According to the invention, solid perishable foodstuffs are dried only partially, that is, to final moisture levels much above those essential for preservation by dehydration alone. Commercial practice in the dehydration of vegetables, milk and eggs requires, for example, reduction of moisture content to 0.5 to 7 percent. The partially dehydrated products are compressed, if desired, and then subsequently frozen while avoiding rehydration thereof, and stored at temperatures substantially below the freezing point of water.

It is preferred that a moisture range from about 66 precent to about 12 percent water be taken as the level to which the products should be dried in the application of the invention, although in certain special cases small variations from this preferred range may become necessary. The optimum final moisture level varies from one product to another and may also depend upon whether the partially dehydrated material is to be compressed before freezing. Products such as fruits and vegetables, when dried to a moisture content of about 50 percent, have lost upwards of three-fourths of their original water content, and when dried to a moisture content of about 20 percent, have lost upwards of nine-tenths of their original water content. At these moisture levels, therefore, most of the reduction in weight which would result on complete dehydration has been achieved.

High-moisture dehydrated products compress readily without breakage and are easily made into satisfactory blocks at low pressures. Such dehydrated foods compressed at relatively low pressures have an advantage over ordinary compressed dehydrated foods in that they rehydrate practically as readily as the uncompressed material. Compression in this manner, therefore, is of special importance in the cases of those products for which no satisfactory compression methods have been devised at low moisture levels, and where it is desired to store large quantities of the material in a small space to permit most efficient use of limited refrigerated storage space.

In general, the process of the invention is simplified as compared to either the dehydration or the freezing steps of the prior art. The most difficult and time-consuming part of dehydration is in the low moisture range and this difficulty is eliminated by the invention. Much of the product damage which occurs during dehydration is due to the long drying time required for reduction of the moisture level to the point required for satisfactory keeping quality. The freezing operation is also simplified since the freezing capacity required for a given quantity of edible food is only a quarter to a tenth of that required for freezing fresh fruits or vegetables. Furthermore, in freezing partially dehydrated foods, rapid freezing is less necessary than for ordinary frozen foods. Also, many products will give satisfactory results if simply frozen in cold storage rooms after partial dehydration or after partial dehydration and compression.

For products requiring rapid freezing, a simple two-stage dehydration-freezing process or a three-stage dehydration-compression-freezing process is feasible. Under usual conditions, the freezing rate of the partially dehydrated products, especially when compressed, is more rapid than for fresh foods because of the smaller proportion of water in the products.

The dehydration-freezing process offers several advantages over ordinary freezing preservation, such as allowing a greater amount of edible material to be stored in a given space with less refrigeration capacity. The storage temperature can be higher than it would be for fresh frozen fruits, and temporary rises in temperature will not affect the product seriously. Also, packing and distribution costs are lower, due to the fact that a greater amount of edible material is contained in a given weight or volume of product. Furthermore, the quality and storage stability of certain products are maintained, or bettered, as for example, in the cases of fresh frozen carrots, which ordinarily are known to take on undesirable watery characteristics; string beans, which are known to lose their crisp texture; peas, which are known to undergo flavor deterioration; and fruits like strawberries, which are known to bleed badly on thawing, and so forth. The markedly diminished heat capacity of the partially dehydrated products and the non-essentiality of the rapid freezing used in processing the fresh materials greatly reduce the refrigeration capacity needed and simplify the equipment requirements.

The dehydration-freezing process offers several advantages over ordinary dehydration, such as permitting complete rehydration of the dehydrated-frozen products more rapidly than those which have been dried to the low-moisture levels necessary for the storage stability of dehydrated foods. The quality of the products from the standpoint of palatability and color is much better than those which have been dried to the low-moisture levels necessary for the storage stability of dehydrated foods, because damage to these characteristics generally occurs as a result of the greatly extended drying times required in achieving the low-moisture levels. Also, plant capacity and cost factors are much more advantageous when dehydration is carried only to a range from about 66 percent to about 12 percent moisture, since drying from these levels to the lower values necessary in ordinary dehydration requires three to ten times as long, while gaining relatively little additional reduction of weight and bulk. Furthermore, the storage life of dehydrated foods at temperatures experienced in usual storage, during shipment, in grocery stores, and so forth, is far from satisfactory on many products and is a function of the temperatures experienced, whereas dehydrated-frozen products held in frozen condition have a storage life many-fold that of the ordinary dried and stored materials. Further, most commodities dehydrated to the low-moisture levels essential to storage stability are very hygroscopic and must be packaged in hermetically sealed containers to prevent moisture-uptake, whereas moisture uptake is not a problem with materials processed by the application of our invention and packaging may thus be simplified. Finally, packaging under inert gases has been found necessary with some ordinarily dehydrated foods such as carrots, cabbage, whole milk, and so forth, but this is unnecessary for dehydrated-frozen products.

The following examples are illustrative of the invention.

Example I

Half cubes (⅜"x⅜"x³⁄₁₆") of Imperator carrots were blanched 3 minutes in steam and quenched in water. One portion of this material was spread on enameled trays, held at −30° F. overnight, packed in cans, and stored at 0° F. Other portions were spread immediately on drying trays and dehydrated in a conventional manner to three different moisture levels—60.1 percent, 41.0 percent, and 26.2 percent. The partially dehydrated material was packaged and frozen at −30° F. After freezing, samples were tested for organoleptic quality. Results of these tests indicate that the dehydrated-frozen products are slightly better than the fresh frozen.

Example II

Shelled green peas were screened to obtain a product consisting of sizes 3, 4, and 5. The material was blanched in steam for 1½ minutes and quenched in water. One portion of the blanched material was held at −30° F. overnight, packaged in friction top cans, and stored at 0° F. The balance of the blanched material was dried in an air-blast tunnel by a conventional procedure to a final moisture content of 29.5 percent. The organoleptic quality of the fresh frozen and dehydrated-frozen products was nearly identical and was high for both products. It is indicated that the texture of the cooked dehydrated-frozen peas is better when the dehydration is not carried so far, and since ordinary dehydrated whole green peas are known to be difficult to rehydrate, stopping the dehydration at higher moisture levels increases the organoleptic quality of this product.

Example III

Half cubes (⅜"x⅜"x³⁄₁₆") of Oregon Russet potatoes were blanched 2 minutes in steam and then partially dehydrated in a conventional manner to moisture levels of 65.6 percent, 57.9 percent, 48.7 percent, 31.9 percent, and 12.4 percent. The partially dehydrated products were placed in cans and frozen at −30° F. A portion of the blanched material was frozen without dehydration as a control, or reference sample. Organoleptic evaluation of cooked material showed the dehydrated-frozen samples to be somewhat better than the fresh frozen material.

The following table indicates the saving in weight and in refrigeration which may be achieved by use of the invention as contrasted with the ordinary freezing of the fresh product. This data was derived from the foregoing cited examples.

|  | Carrots, Percent | | | Peas, Percent | Potatoes, Percent | | | | |
| --- | --- | --- | --- | --- | --- | --- | --- | --- | --- |
| Moisture level before freezing or drying | 89.3 | 89.3 | 89.3 | 78.7 | 82.4 | 82.4 | 82.4 | 82.4 | 82.4 |
| Moisture level to which dried before freezing | 60.1 | 41.0 | 26.2 | 29.5 | 65.6 | 57.9 | 48.7 | 31.9 | 12.4 |
| Saving in refrigeration | 81 | 90 | 94 | 86 | 58 | 69 | 78 | 88 | 94 |
| Saving in weight | 73 | 82 | 86 | 70 | 49 | 58 | 66 | 74 | 80 |

From a knowledge of the relative costs of dehydration and freezing, it is apparent that the processing expense involved in the partial dehydration process is more than offset by the savings effected by reduction of refrigeration requirements.

Having thus described our invention, we claim:

1. A process comprising partially dehydrating a solid, perishable foodstuff to a moisture content from about 66 percent to about 12 percent, freezing the partially dehydrated foodstuff while avoiding rehydration thereof, and maintaining the frozen, partially dehydrated foodstuff in frozen storage.

2. A process comprising partially dehydrating a solid, perishable foodstuff to a moisture content from about 66 per cent to about 12 percent, compressing the partially dehydrated foodstuff, freezing the compressed, partially dehydrated foodstuff while avoiding rehydration thereof, and maintaining the frozen, compressed, partially dehydrated foodstuff in frozen storage.

3. A process comprising partially dehydrating a solid, perishable vegetable to a moisture content from about 66 percent to about 12 percent, freezing the partially dehydrated vegetable while avoiding rehydration thereof, and maintaining the frozen, partially dehydrated vegetable in frozen storage.

4. A process comprising partially dehydrating a solid, perishable foodstuff to a moisture content from about 66 percent to about 12 percent, packaging the partially dehydrated foodstuff, freezing the packaged, partially dehydrated foodstuff while avoiding rehydration thereof, and maintaining the frozen, packaged, partially dehydrated foodstuff in frozen storage.

LOUIS B. HOWARD.
WILLIAM D. RAMAGE.
CLYDE L. RASMUSSEN.

REFERENCES CITED

The following references are of record in the file of this patent:

UNITED STATES PATENTS

| Number | Name | Date |
| --- | --- | --- |
| 2,278,472 | Musher | Apr. 7, 1942 |
| 2,412,203 | Brunkhurst | Dec. 10, 1946 |
| 2,419,877 | Birdseye | Apr. 29, 1947 |

FOREIGN PATENTS

| Number | Country | Date |
| --- | --- | --- |
| 12,642 | Great Britain | 1905 |

OTHER REFERENCES

Scientific American, June 1943, pages 265–266.